United States Patent [19]

Henniges

[11] 4,184,722

[45] Jan. 22, 1980

[54] BEARING BRASS FOR THE JOURNAL BEARINGS OF RAIL VEHICLES

[75] Inventor: Ernst Henniges, Hanover, Fed. Rep. of Germany

[73] Assignee: Gummi-Henniges, Hanover, Fed. Rep. of Germany

[21] Appl. No.: 884,584

[22] Filed: Mar. 8, 1978

[30] Foreign Application Priority Data

Mar. 11, 1977 [DE] Fed. Rep. of Germany ....... 2710590

[51] Int. Cl.² .................. F16C 33/08; F16C 33/10
[52] U.S. Cl. ...................................... 308/38; 308/53; 308/56; 308/79.1
[58] Field of Search ............... 308/38, 56, 57, 53, 308/54, 79.1, 79 R, 240, 243

[56] References Cited

U.S. PATENT DOCUMENTS

| | | | |
|---|---|---|---|
| 652,026 | 6/1900 | Jacquemin | 308/79.1 |
| 893,410 | 7/1908 | Wilson | 308/56 |
| 905,355 | 12/1908 | Peckham | 308/56 |
| 2,044,514 | 6/1936 | Tatum | 308/79.1 |
| 2,941,849 | 6/1960 | Sale | 308/38 |
| 3,020,099 | 2/1962 | Smith | 308/56 |
| 3,020,100 | 2/1962 | Smith | 308/56 |

FOREIGN PATENT DOCUMENTS 1067465 10/1956 Fed. Rep. of Germany ............. 308/53

*Primary Examiner*—Charles E. Frankfort
*Attorney, Agent, or Firm*—Gilbert L. Wells

[57] ABSTRACT

A bearing brass for the journal bearings of rail vehicles, where the bearing brass is in the form of a part-circular segmental bearing member and is arranged in a journal bearing box above the axle. The journal bearing box retains underneath the axle a lubricating pad receiving lubricant from an oil sump, and the lubricating pad serves to lubricate the rotating axle journal extending into the journal bearing box. The bearing brass comprises a support body preferably consisting of cast iron and a bearing brass segment consisting of babbit metal. The bearing brass segment is cast into dovetail shaped grooves of the support body after a prior tinning of the support body.

4 Claims, 2 Drawing Figures

BEARING BRASS FOR THE JOURNAL BEARINGS OF RAIL VEHICLES

Cross Reference to a Related Application

Applicant claims priority under 35 USC 119 for application P 27 10 590.4 filed Mar. 11, 1977 in the Patent Office of the Federal Republic of Germany.

BACKGROUND OF THE INVENTION

The present invention relates to a bearing brass for the journal bearings of rail vehicles, where the bearing brass is in the form of a part-circular segmental bearing member and is arranged in a journal bearing box above the axle.

The closest journal bearing boxes of the prior art retain, under the axle, a lubricating pad receiving lubricant from an oil sump. This lubricating pad serves to lubricate the rotating axle journal extending into the journal bearing box. The bearing brass comprises a support body consisting of cast iron and a bearing brass segment consisting of babbitt metal.

This bearing brass of the prior art has the disadvantage that two different components are present which necessitate an additional inventory storage.

A further disadvantage is that during traveling movements the support body is able to drop out as a result of the motions of the journal bearing box. Also, the bearing brass is able to slide around the axle journal as a result of its low structural height when movements of the journal bearing box occur. The latter particularly does occur when the bearing brass increasingly wears and its lateral clearance in the journal bearing box increases. Both operational disadvantages result in a hot running and in material bearing damages.

SUMMARY OF THE INVENTION

It is the object of the present invention to avoid these disadvantages of the prior art and to provide a bearing brass which is reliably retained in its position.

To attain this object the present invention provides a bearing brass for the journal bearings of rail vehicles, this bearing brass being in the form of a part-circular segmental bearing member and arranged in a journal bearing box above the axle, the journal bearing box retaining underneath the axle a lubricating pad receiving lubricant from an oil sump, this lubricating pad serving to lubricate the rotating axle journal extending into the journal bearing box, the bearing brass comprising a support body preferably consisting of cast iron and a bearing brass segment consisting of babbitt metal, characterized in that the bearing brass segment is arranged cast into dovetail shaped grooves of the support body after a prior tinning of the support body.

By this arrangement it is achieved that the support body and the bearing brass segment are combined into a single component part, the two individual parts of the bearing brass not being able to detach from one another even in case of most unfavorable operational conditions. The disadvantages of the conventional arrangement are thus effectively avoided.

It is also achieved with the arrangement proposed by the present invention that in the area of the dovetail shaped grooves depressions are advantageously formed in the internal surface of the bearing brass segment in which depressions the lubricant conveyed towards the bearing brass from the lubricating pad by the rotation of the axle journal is able to collect and from where it is passed to the actual load-bearing surfaces disposed between the dovetail-shaped grooves in forming a lubricant film. As compared with the conventional arrangement, thus a material improvement of the lubricating action is achieved with the arrangement of the present invention.

In order to limit the axial displaceability of the bearing brass in the journal bearing box, conveniently a bracket member may be cast onto the front end face of the support body. Also, the bearing brass back may be formed downcurved for an adjustment of the journal bearing box according to the deflection of the axle journal.

For manufacturing reasons and in order to permit a reliable intercasting of the bearing metal and the support body, the individual dovetail-shaped grooves must have a relatively large spacing from one another along the length of the bearing brass. As a result of this relatively large spacing between the individual dovetail-shaped grooves, a tearing off of the lubricant film by virtue of the relatively large areas disposed therebetween and, locally, a dry operation causing an increased wear and a hot running, respectively, might occur.

In order to reliably prevent this, an additional groove is preferably provided between each two neighboring dovetail-shaped grooves and/or in front of an/or behind the last dovetail-shaped groove parallel to the groove-shaped depressions formed in the area of the dovetail-shaped grooves in the internal surface of the bearing brass segment, the dimensions of the additional grooves substantially corresponding to the groove-shaped depressions which have resulted by a shrinking of the material of the bearing brass segment in the area of the dovetail-shaped grooves.

It is accomplished with this arrangement that the load-bearing surfaces defined between the individual dovetail-shaped grooves are kept relatively small so that it is ensured in all events that a complete lubricant film extending across the remaining rest surfaces is maintained. This in particular is also promoted by the fact that the additional grooves are able to receive and convey lubricant themselves.

The additional grooves have preferably a depth of about one to two hundredths of a millimeter and a width of about five to ten millimeters.

The additional grooves may have a rectangular cross section and it is convenient and advantageous for a production of the lubricant film, however, that they be formed rounded.

The arrangement of the present invention may also be advantageously applied using an arrangement equipped with a wedge-shaped support plate inserted between the support body and the housing of the bearing section. Such an arrangement offers the advantage of permitting fitting the one and same bearing section to bearing section housings of various dimensions by correspondingly sizing the wedge-shaped support plate.

BRIEF DESCRIPTION OF THE DRAWINGS

An embodiment of the invention is now described by way of example and with reference to the accompanying drawings, in which.

DESCRIPTION OF THE PREFERRED EMBODIMENTS

Figure 1:
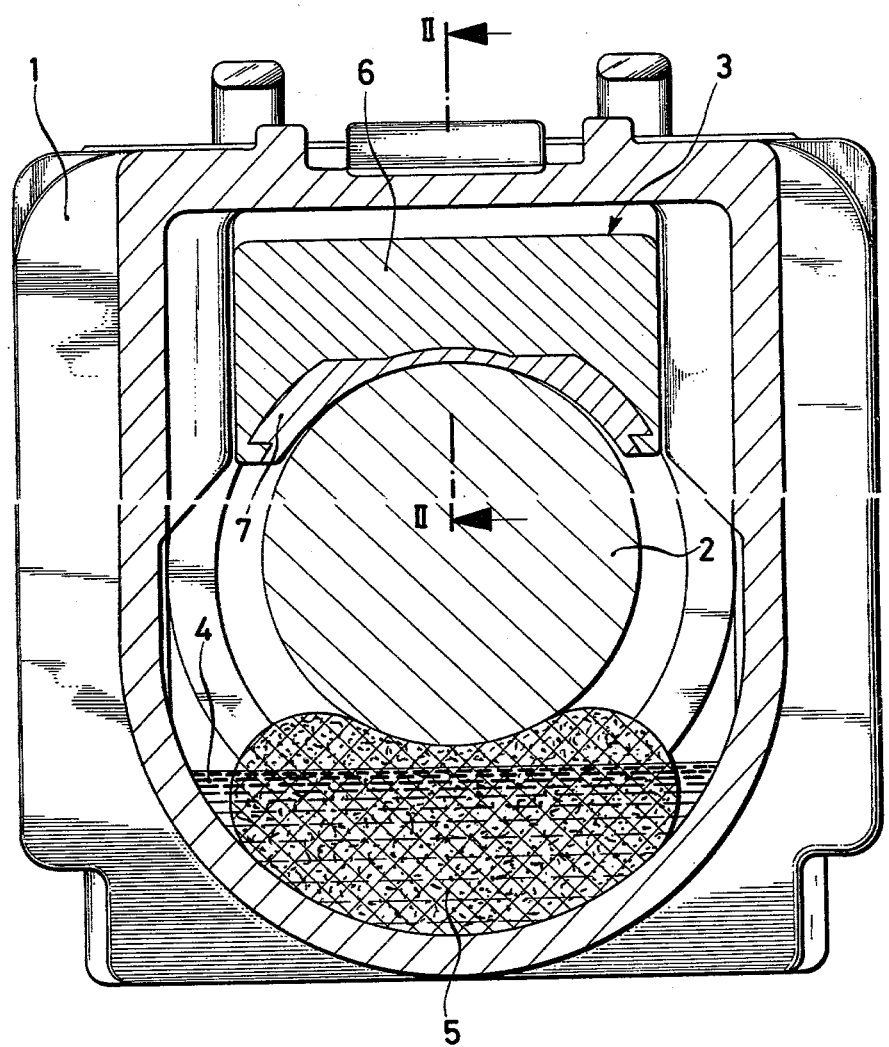
FIG. 1 is a vertical cross section of a journal bearing box including a bearing brass according to the invention.

FIG. 1 shows a bearing brass 3 in the form of a part-circular segment bearing member. This bearing brass 3 is arranged in a journal bearing box 1 above an axle journal 2 extending into the journal bearing box. The bearing box 1 retains a lubricating pad 5 underneath the axle 2, said lubricating pad receiving lubricant from an oil sump 4 and serving to lubricate the rotating axle journal 2 extending into the journal bearing box 1.

The bearing brass 3 comprises a support body 6 preferably made of cast iron and carrying the actual bearing brass segment 7. The bearing brass segment 7 consists of a babbitt metal and is cast into dovetail-shaped grooves 8 (see FIG. 2) of the support body 6 after a prior tinning of the support body. In this way an integral component is defined by the support body 6 and the bearing brass segment 7.

Figure 2:
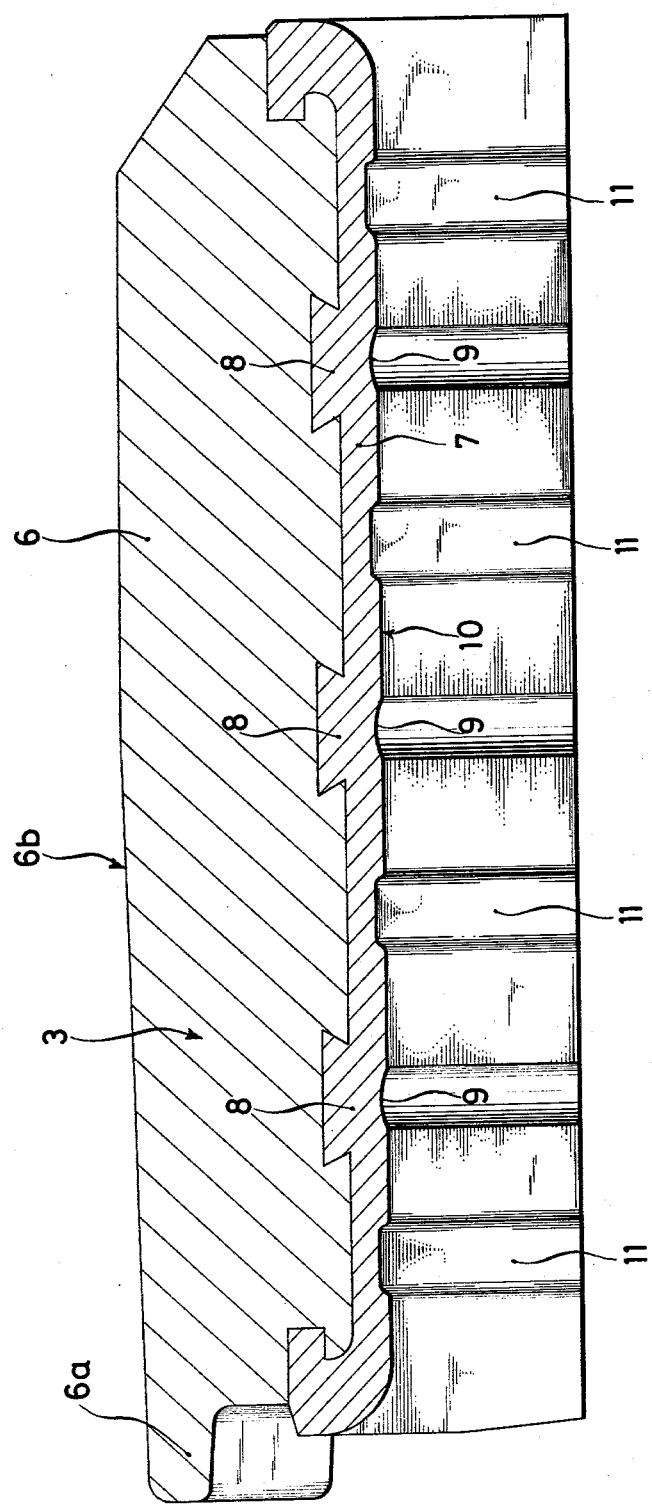
FIG. 2 is a vertical longitudinal section taken on the line II—II of FIG. 1.

FIG. 2 shows a bracket member 6a cast onto the support body 6, said bracket member serving to limit the axial displaceability of the bearing brass 3 in the journal bearing box 1. This bracket member 6a is located at the front end face of the bearing brass 3. Furthermore, the bearing brass back 6b is formed down-curved for an adjustment of the journal bearing box according to the axle journal deflection.

As a result of the material concentration of the babbit metal of the actual bearing brass segment 7 in the area of the dovetail-shaped grooves 8, groove-shaped depressions 9 occur in the area of these dovetail-shaped grooves, which have been illustrated in a somewhat larger scale in FIG. 2 for a better understanding. The depressions 9 resulting in the area of the dovetail-shaped grooves 8 have the effect that the lubricant conveyed from the lubricating pad 5 towards the bearing brass 3 by the rotation of the axle journal 2 is able to collect in these depressions 9 and is passed from there to the load-bearing surfaces 10 disposed between the dovetail-shaped grooves 8 in forming a lubricant film.

In order to ensure a proper running of the bearing even in the event of unfavorable and extended operational conditions, additional grooves 11 are provided in the load-bearing surfaces 10 which in the embodiment illustrated are respectively arranged in the area between the dovetail-shaped grooves 8 and additionally at the front and/or rear thereof. Thereby, the load-bearing surfaces 10 defined between the individual dovetail-shaped grooves 8 are kept relatively small so that a complete lubricant film extending across the remaining rest surfaces is maintained. The additional grooves 11 in turn also receive lubricant and convey it in the manner specified. The additional grooves 11 may have a depth of about one or two hundredths of a millimeter and a width of about five to ten millimeters. Conveniently they are formed rounded at their marginal regions—as illustrated.

I claim:

1. A bearing brass for the journal bearings of rail vehicles, said bearing brass formed of a part-circular segmental bearing member and arranged in a journal bearing box above an axle, said journal bearing box retaining underneath said axle a lubricating pad receiving lubricant from an oil sump, said lubricating pad serving to lubricate a rotating axle journal extending into said journal bearing box, said bearing brass comprising a tinned support body comprising cast iron having a plurality of dovetail-shaped grooves transverse to said axle journal and a bearing brass segment of babbitt metal having an external surface cast into said dovetail-shaped grooves and an internal surface bearing on said axle journal, groove-shaped depressions formed in said internal surface of said bearing brass segment below said dovetail-shaped grooves as a consequence of shrinkage of said babbitt metal in the region of said dovetail shaped grooves during cooling thereof, and additional grooves provided in said internal surface between each two neighboring groove-shaped depressions and in front of and behind and parallel to said groove-shaped depressions, said additional grooves having dimensions substantially corresponding to said groove-shaped depressions, said groove-shaped depressions and said additional grooves acting to collect lubricant, thereby enhancing formation a a lubricating film between said bearing brass segment and said axle journal.

2. A bearing brass according to Claim 1, wherein said additional grooves have a depth of about one to two hundredths of a millimeter and a width of about five to ten millimeters.

3. A bearing brass according to Claim 2, wherein said additional grooves have a rectangular cross section.

4. A bearing brass according to Claim 2, wherein said additional grooves are formed rounded.

* * * * *